United States Patent [19]
Smith

[11] 3,779,368
[45] Dec. 18, 1973

[54] WEAR STRIP CONSTRUCTION FOR CONVEYOR

[75] Inventor: Wayne A. Smith, Shorewood, Wis.

[73] Assignee: Jos. Schlitz Brewing Company, Milwaukee, Wis.

[22] Filed: Nov. 17, 1971

[21] Appl. No.: 199,545

[52] U.S. Cl. .............................................. 198/204
[51] Int. Cl. ............................................ B65g 15/60
[58] Field of Search ..................... 198/204, 205, 184

[56] References Cited
UNITED STATES PATENTS

| | | | |
|---|---|---|---|
| 1,214,519 | 2/1917 | Demuth | 198/204 X |
| 3,605,994 | 9/1971 | Parlette | 198/204 |
| 1,946,805 | 2/1934 | Mojonnier | 198/204 |

FOREIGN PATENTS OR APPLICATIONS

| | | | |
|---|---|---|---|
| 213,137 | 6/1960 | Austria | 198/204 |

Primary Examiner—Evon C. Blunk
Assistant Examiner—Douglas D. Watts
Attorney—Glenn O. Starke

[57] ABSTRACT

An improved wear strip construction for a conveyor. The conveyor includes a pair of spaced side walls and the upper and lower extremities of each side wall are provided with inwardly extending flanges. Metal wear strips are snap fitted on the upper flanges of the side walls and serve to support the side edges of a plastic link belt conveyor chain in a conveying path of travel, while a sinusoidal metal wear strip is supported on the lower flanges of the side walls and serves to support the link chain in its return path of travel.

6 Claims, 6 Drawing Figures

PATENTED DEC 18 1973

INVENTOR.
WAYNE A. SMITH

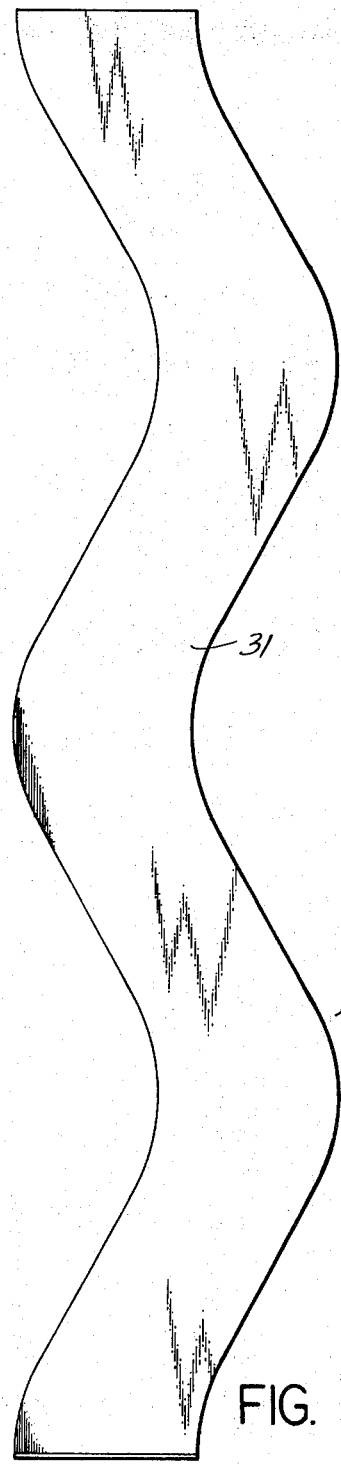
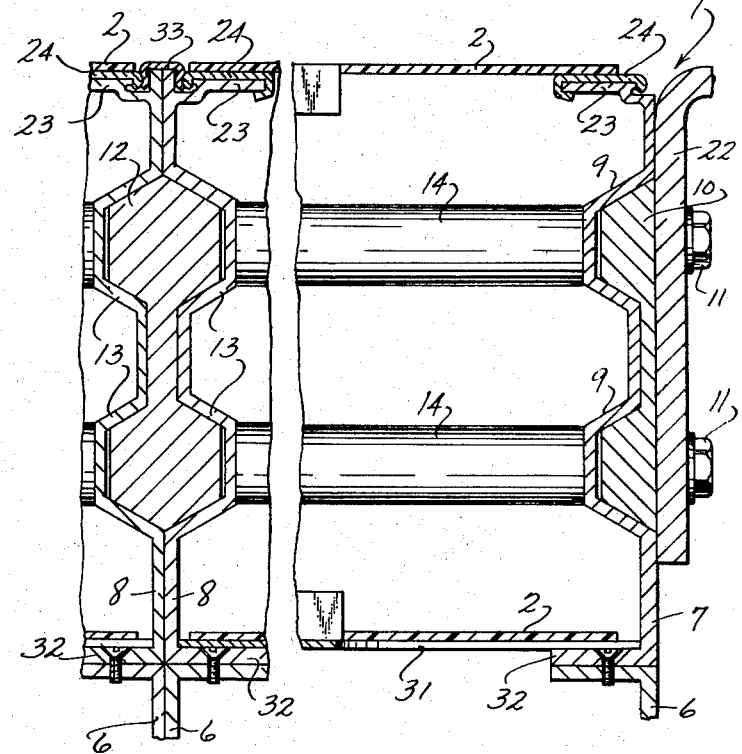
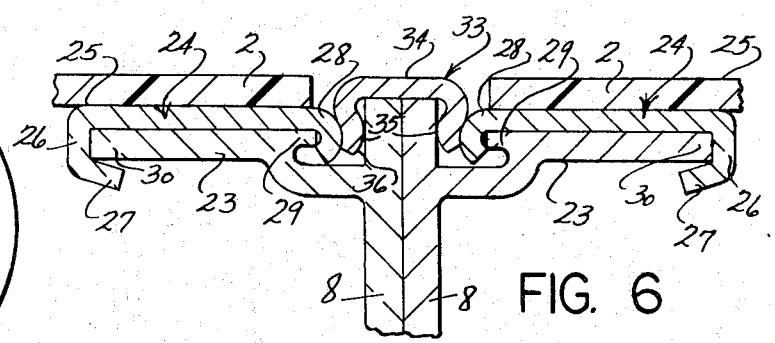
FIG. 3
FIG. 4
FIG. 6
INVENTOR.
WAYNE A. SMITH

WEAR STRIP CONSTRUCTION FOR CONVEYOR

BACKGROUND OF THE INVENTION

In a bottling plant, such as a brewery, the bottles or cans are moved through the plant by a conveying system composed of a series of endless, tabletop conveyors. When conveying metal cans, a plastic link belt chain is normally used as the plastic has a more favorable coefficient of friction, and galling of the metal cans, as may occur if a metal chain is employed, is prevented.

To support the plastic link belt chain in travel, the side edges of the chain normally ride on stainless steel wear strips which are attached to the side walls of the conveyor frame at spaced locations by flathead screws. As the screws are normally placed about 12 inches on center and as the conveyor can have a substantial length of several hundred feet, the installation and removal of the stainless steel wear strips is a time consuming and costly operation. Moreover, as the wear strips are not attached continuously throughout their length, but only at the locations of the screws, there is a tendency for the portions of the wear strip between the screws to hump or warp which produces an uneven path of travel for the cans or other articles being conveyed. As a further problem, the inherent vibration in the system may cause the screws to loosen so that the screws may present an obstruction to travel of the chain.

SUMMARY OF THE INVENTION

The invention is directed to an improved wear strip construction for a plastic, link belt conveyor chain. The conveyor includes a pair of spaced side walls and the upper and lower extremities of each side wall are provided with inwardly extending flanges. Stainless steel wear strips are snapped on the upper flange of each side wall and serve to support the side edges of the plastic conveyor chain in travel in its conveying path, while a wear strip of sinusoidal configuration is supported on the lower flanges of the side walls and supports the return path of travel of the chain.

As the stainless steel wear strips are adapted to snap into place on the upper flanges of the side walls, the wear strips can be installed and removed in a minimum period of time, thereby substantially reducing the labor cost in installation and maintenance. Moreover, as the wear strips are attached to the flanges continuously throughout their length, there is no tendency for the wear strips to hump or warp, thereby providing a uniform and smooth path of travel for the conveyor chain.

The use of the sinusoidal or zigzag wear strip which is supported on the lower flanges of the side walls will distribute ear throughout the width of the chain, as opposed to the use of edge strips which concentrate the wear along the side edges of the chain.

Furthermore, the use of the sinusoidal wear strips provides a supporting structure for the return path of the chain which is discontinuous so that clean-in-place techniques can be employed and the cleaning liquid can drain through the wear strip. As a further advantage, the sinusoidal wear strips provide a metal savings, in that a series of the strips can be blanked out of a single piece of metal with minimum scrap.

Other objects and advantages will appear in the course of the following description.

The drawings illustrate the best mode presently contemplated of carrying out the invention.

In the drawings:

FIG. 3 is an enlarged transverse section with parts broken away showing the upper wear strip construction;

FIG. 4 is an enlarged transverse section of the conveyor;

FIG. 6 is an enlarged fragmentary transverse section showing the insert between conveyor chains.

Figure 1:
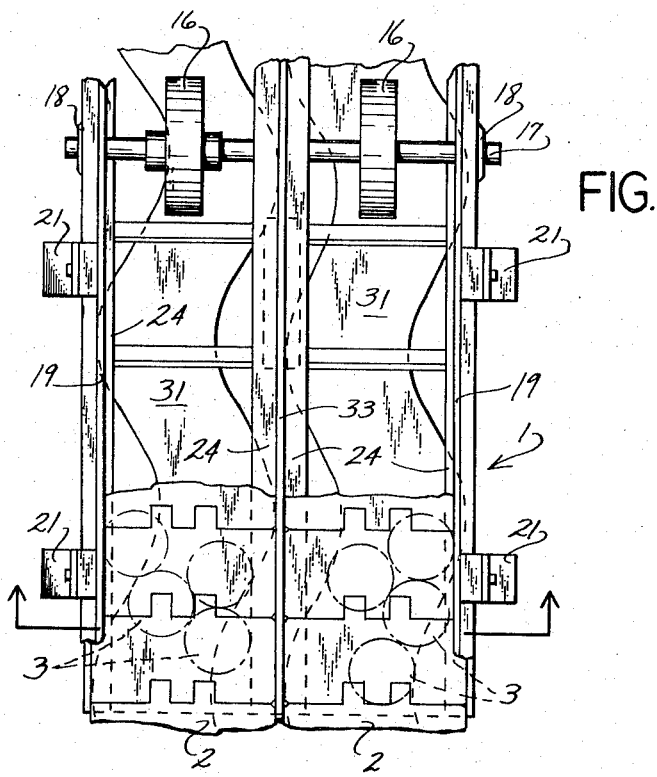
FIG. 1 is a plan view with parts broken away of a conveyor section utilizing the wear strip construction of the invention.

The drawings illustrate a conveying mechanism which is particularly adapted for conveying cans in a bottling plant, such as a brewery or soft drink plant. The conveyor 1 supports a pair of parallel endless, plastic link chains 2 of conventional construction and a series of cans 3 are adapted to be conveyed by the conveyor chains 3 in the direction indicated by the arrow in FIG. 1.

The conveyor 1 can be constructed in a manner similar to that shown in U. S. Pat. application Ser. No. 870,033, filed Oct. 28, 1969, now U. S. Pat. No. 3,692,244 and includes a base 4, and a bottom plate 5 rests on the base and supports a series of channels 6, which are bolted to the bottom plate. As best shown in FIG. 3, side walls 7 and central walls 8 are mounted on the upper flanges of the channels 6. The side walls 7 and central walls 8 are of identical construction and are preferably formed of aluminum extrusions having a length up to 10 feet, depending on the overall size of the conveyor.

The walls 7 are provided with a pair of longitudinally extending grooves 9 which are bordered by diagonal surfaces that diverge outwardly. The side walls 7 are connected in end-to-end relation by a connecting member or insert 10 provided with a pair of longitudinal ridges or lands which complement and are received within the aligned grooves 9 in the side walls. The connecting members 10 are positioned across the joint between the abutting ends of two side walls 7 and are connected to the respective side walls by bolts 11.

The central walls 8 are connected together in end-to-end relation in a similar manner by connecting members or inserts 12 having longitudinal ridges or lands on opposite surfaces which are received within the grooves 13 in the respective central walls. The ridges are provided with diagonal or inclined surfaces which wedge against the complementary diagonal surfaces bordering the grooves 13 in the central wall to accurately align the central walls 8 in an end-to-end relation.

To tie the side walls 7 and central walls 8 together, a series of rods 14 extend between the walls 7 and 8 and a stud 15 is threaded within the adjacent inner ends of the rods and extends through aligned openings in the central walls 8. In addition, studs, not shown, are threaded within openings in the outer ends of the rods 14 and extend through openings in the side walls 7 and receive nuts. The rods 14 serve to space the side wall 7 from the adjacent central wall 8 and provide a connection between the members.

Figure 2:
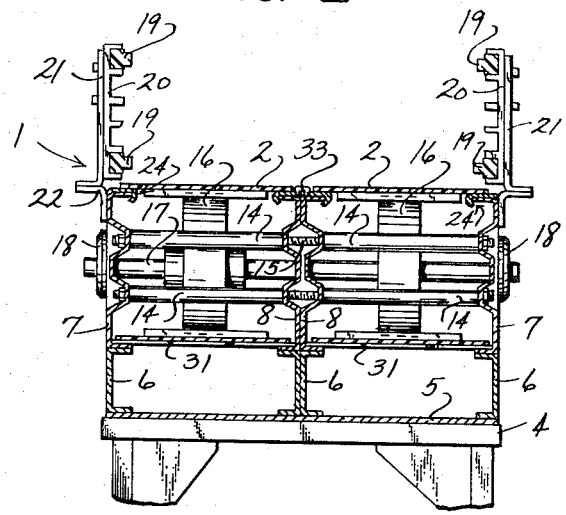
FIG. 2 is a transverse section taken along lines 2—2 of FIG. 1.

As shown in FIGS. 1 and 2, the link belt chains 2 are mounted for endless travel on the conveyor frame and each chain is driven in a conventional manner by a sprocket 16 which engages hinge knuckles on the lower surface of the respective chain. Sprockets 16 are mounted on a shaft 17 which extend transversely of the conveyor and the ends of the shaft are journalled within bearing assemblies 18 connected to the side walls 7 of the conveyor. A suitable drive mechanism, such as a motor operated chain drive, is connected to shaft 17 to rotate the shaft and drive the conveyor chains 2.

To guide the cans in movement on the conveyor chains 2, guide rail assemblies are provided which are supported by the side wall 7. As shown in FIG. 2, each guide rail assembly includes one or more horizontal, plastic guide rails 19 which are mounted within vertical brackets 20. Each bracket 20 is supported by an angle 21 and the lower flange of angle 21 is bolted to the upper horizontal flange of an angle 22 that is secured to the side wall 7.

Figure 5:
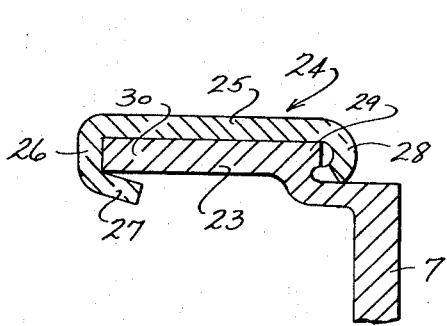
FIG. 5 is a plan view of a sinusoidal wear strip which is supported on the lower flanges of the side walls.

According to the invention, the upper edge of each side wall 7 and central wall 8 is provided with a flange 23, and a stainless steel wear strip 24 is mounted on each flange 23 and serves to support the side edges of chain 2 in its conveying path of travel. As best illustrated in FIG. 5, each wear strip 24 includes an upper supporting surface 25 and a reverse bend 26 that is engaged with the free end of the flange 23. The reverse bend 26 terminates in a downwardly extending section 27 which is located at an angle of about 15° to the horizontal. The opposite edge of the wear strip 25 is curved or hooked, as indicated at 28, and is adapted to engage the lip or projection 29 formed on the flange 23.

To install the wear strip 24, the bent end 26 is initially inserted over the free end 30 of the flange 23, and the hooked end 28 is then pushed downwardly causing it to snap into engagement with the lip 29 on the flange. The snap fit can be accomplished due to the fact that there is some resiliency in the wear strip 24, and, in addition, the wear strip is formed of a harder metal, such as stainless steel, than the side wall, which is normally formed of aluminum, so that the projection or lip 29 can deform to receive the hooked end 28.

As the wear strip 24 is attached to the flange throughout its entire length, there will be no tendency for portions of the wear strip to hump or warp as can occur in conventional constructions in which the wear strip is attached to the conveyor frame at spaced locations by use of flathead screws or the like.

The lower or return path of travel of each of the conveyor chains 2 is supported by a wear strip 31 having a generally zigzag or sinusoidal configuration. As best illustrated in FIG. 1, spaced locations of each side edge of wear strip 31 are supported on the lower flanges 32 of the respective side walls and central walls 8, while other portions of the side edges of the wear strip 31 will be spaced from the respective lower flanges to provide openings therebetween. The wear strip 31 can be secured to the lower flanges 32 by means of spot welds or other fasteners.

The use of the sinusoidal or zigzag wear strip 31 has distinct advantages in that all portions of the width of the chain 2 are supported by the wear strip 31 during its travel, thereby distributing the wear across the width of the conveyor chain and eliminating a tendency for excessive wear to develop along the side edge portions of the chain. Moreover, the use of the sinusoidal configuration provides openings between the side edges of the wear strip 31 and the flanges 32 which facilitates cleaning-in-place, in that the cleaning liquid can flow downwardly through these openings to a collection site.

A series of sinusoidal wear strips 31 can be blanked out of a large metal piece with a minimum of waste, and the curved sinusoidal pattern provides additional benefits in that the die construction is facilitated as compared to a construction in which sharp corners are provided in the zigzag pattern.

To provide support for the cans 3 in the gap between the side edges of the chains 2, a stainless steel insert 33 is snap fitted between the wear strips 24, as best shown in FIG. 6. The insert 33 has a generally flat upper surface 34 which is flush with the upper surfaces of conveyor chains 2 and serves to support the cans 3. The central portion or waist 35 of the insert is reduced in thickness and outwardly extending legs 36 extend downwardly and outwardly from waist 35. To install the strip 33, the legs 36 can be deformed inwardly and inserted between the ends 28 of the wear strips 24. The resiliency of the legs 36 will then cause the same to move outwardly to maintain the strip in position with respect to the wear strips 24.

The wear strip construction of the invention provides substantial advantages over conventional prior art types. The upper strips 24 can be readily snapped into place on the flanges 23 and this substantially reduces the time required for installation or removal of the wear strips. As the wear strips 24 are attached to the flanges 23 throughout their length, there will be no tendency for the wear strips to hump or warp as may occur with conventional constructions in which the wear strips are attached by screws or other fasteners at spaced locations.

As the wear strips 24 do not require the use of screws or other fasteners, there is no possibility of fasteners protruding above the level of the wear strips which could interfere with movement of the chains 2.

The sinusoidal wear strips provide support for the entire width of the chain 2 in its return path of travel, and, in addition, provide openings through which cleaning fluid can be drained during clean-in-place operations.

Various modes of carrying out the invention are contemplated as being within the scope of the following claims particularly pointing out and distinctly claiming the subject matter which is regarded as the invention.

I claim:

1. In a conveyor system, a conveyor frame including a pair of generally parallel vertical walls, each of said walls having an upper flange and a lower flange with the upper flanges of said walls facing toward each other and the lower flanges of said walls facing toward each other, an upper wear strip secured to each upper flange, a lower wear strip of generally zigzag configuration supported on both the lower flanges of said walls, and a link belt endless conveying member mounted for travel on said frame in an upper path and a lower path, the side edges of said conveying member being supported on said upper wear strips when the conveying member is moving in its upper path of travel and said conveying member being supported on said lower wear strip when moving in its lower path of travel.

2. The conveying system of claim 1, wherein said upper wear strip includes an edge portion having a reverse bend and disposed in engagement with the extremity of the respec-tive flange, and the opposite edge of said wear strip is hooked, said flange being provided with an outwardly extending lip disposed to be engaged by the hooked edge of the wear strip.

3. The conveying system of claim 2, wherein the reverse bend terminates in a free edge extending at an acute angle to the horizontal.

4. The conveying system of claim 2, wherein said upper wear strip has a flat upper surface disposed to support the conveying member and both said reverse bend and hooked edge extend downwardly from said upper surface.

5. The conveying system of claim 1, in which first spaced portions of each side edge of the lower wear strip are supported on the respective lower flanges and second portions of each side edge are spaced from the respective lower flange to provide openings therebetween.

6. The conveyor system of claim 1, wherein the wear strips are metal and the link belt is plastic.

* * * * *